United States Patent [19]

Post et al.

[11] Patent Number: 5,187,655
[45] Date of Patent: Feb. 16, 1993

[54] PORTABLE PROGRAMMER FOR A LIGHTING CONTROL

[75] Inventors: Robert P. Post, Allentown; Michael J. D'Aleo, Erwinna; Doug W. Keeports, Doylestown; Jonathan H. Ference, Riegelsville; David G. Luchaco, Macungie; Joel S. Spira, Coopersburg, all of Pa.

[73] Assignee: Lutron Electronic Co., Inc., Coopersburg, Pa.

[21] Appl. No.: 465,354

[22] Filed: Jan. 16, 1990

[51] Int. Cl.$^5$ .................. G05B 11/01; H05B 37/02
[52] U.S. Cl. .................. 364/146; 364/188; 364/191; 315/292; 315/295
[58] Field of Search .......... 364/140, 146, 188, 189, 364/191, 143, 144; 315/288, 295, 291, 314, 292, 297, 294

[56] References Cited

U.S. PATENT DOCUMENTS

| | | | |
|---|---|---|---|
| 4,575,660 | 3/1986 | Zaharchuk et al. | 315/295 |
| 4,703,412 | 10/1987 | Cunningham et al. | 364/140 |
| 4,727,296 | 2/1988 | Zaharchuk et al. | 315/295 |
| 4,792,731 | 12/1988 | Pearlman et al. | 315/316 |
| 4,889,999 | 12/1989 | Rowen | 307/31 |
| 4,924,151 | 5/1990 | D'Aleo et al. | 315/295 |
| 5,005,211 | 4/1991 | Yuhasz | 455/603 |

OTHER PUBLICATIONS

Lutron Electronics Co. Orion$^R$ brochure Apr. 1985.
Light NET Miniprogrammer brochure (date unknown).
Oyster Hand-Held Controller brochure (date unknown).
Polaron Controls Limited brochure, p. 3 (date unknown).
Lithonia Hand-Held Controller brochure Apr. 1989.
Environ 2 Programmable Master Station brochure Sep. 1986.
Electrosonic Digidim brochure, p. 4 (date unknown).
Electrosonic Scenemaker User's Handbook Jun. 1985.
Macro Electronics Symmetry TM EPC-2 brochure Apr. 1989.
Prestige Control Consoles brochure (date unknown).

*Primary Examiner*—Jerry Smith
*Assistant Examiner*—Paul Gordon
*Attorney, Agent, or Firm*—Seidel, Gonda, Lavorgna & Monaco

[57] ABSTRACT

A hand-held programmer is provided for adjusting various functions of a multi-scene, multi-zone programmable lighting control. The programmer generally includes push-buttons for selecting particular scenes and zones to be programmed and for activating any one of the functions to be adjusted; namely, intensity, fade time, and fade delay. An alphanumeric LCD display includes a number of controllable display areas, adjacent to and aligned with the push-buttons, for identifying the names of the selected scene and zone and the function settings associated with them. A cylindrically elongated rotary encoder, having a knurled, rubbery surface, is easily manipulated to adjust the setting of the activated function and provides kinesthetic feedback, so that its adjustment can be coordinated with a visual perception of the lighting scene. A locking type socket receives a corresponding plug for electrically connecting the programmer to a wall station in any one of a number of lighting areas to provide communication between the programmer and the lighting control. Once connected to a wall station in a particular area, the programmer is prevented from selecting scenes or zones in other areas to prevent inadvertent misadjustments.

46 Claims, 8 Drawing Sheets

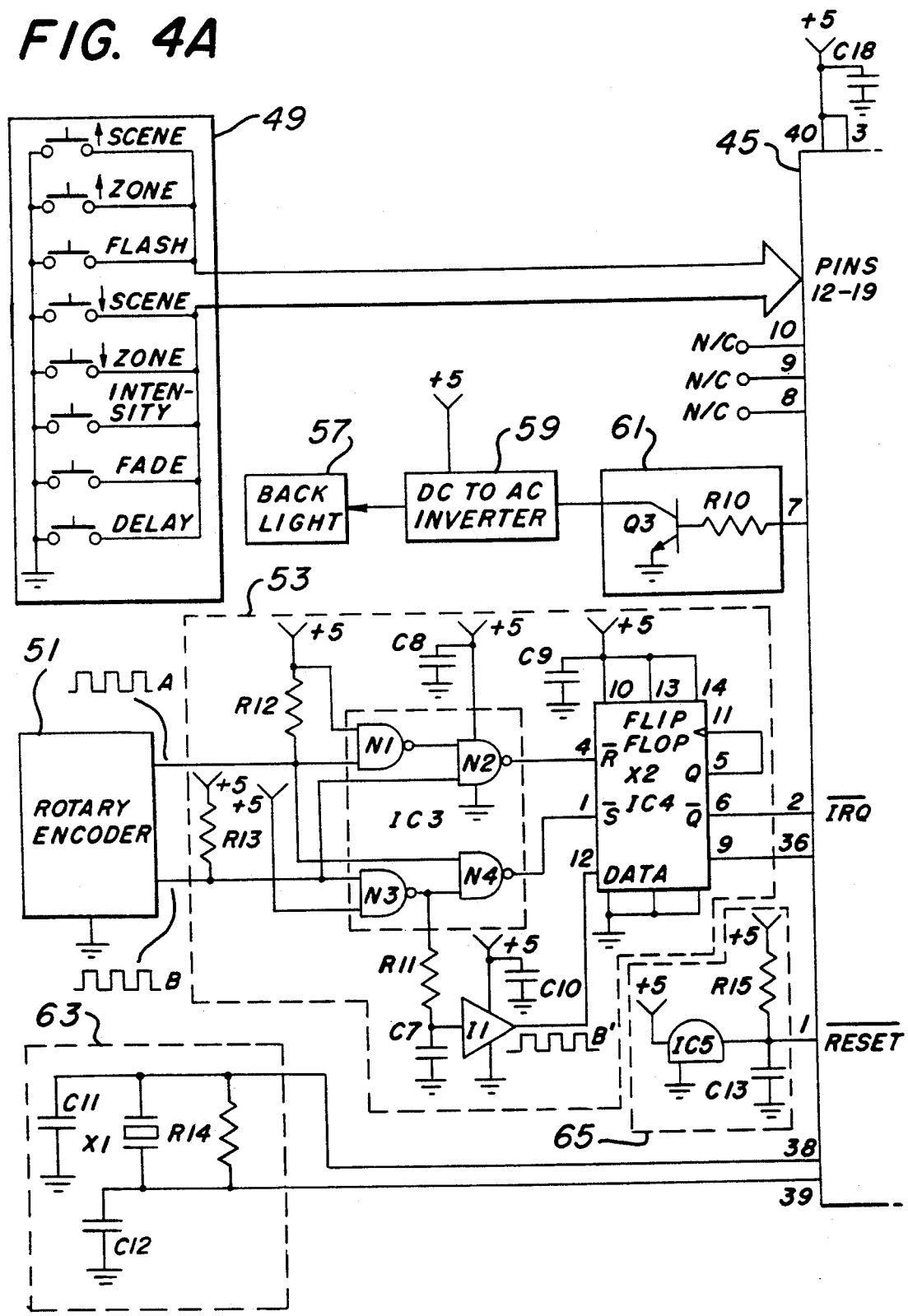

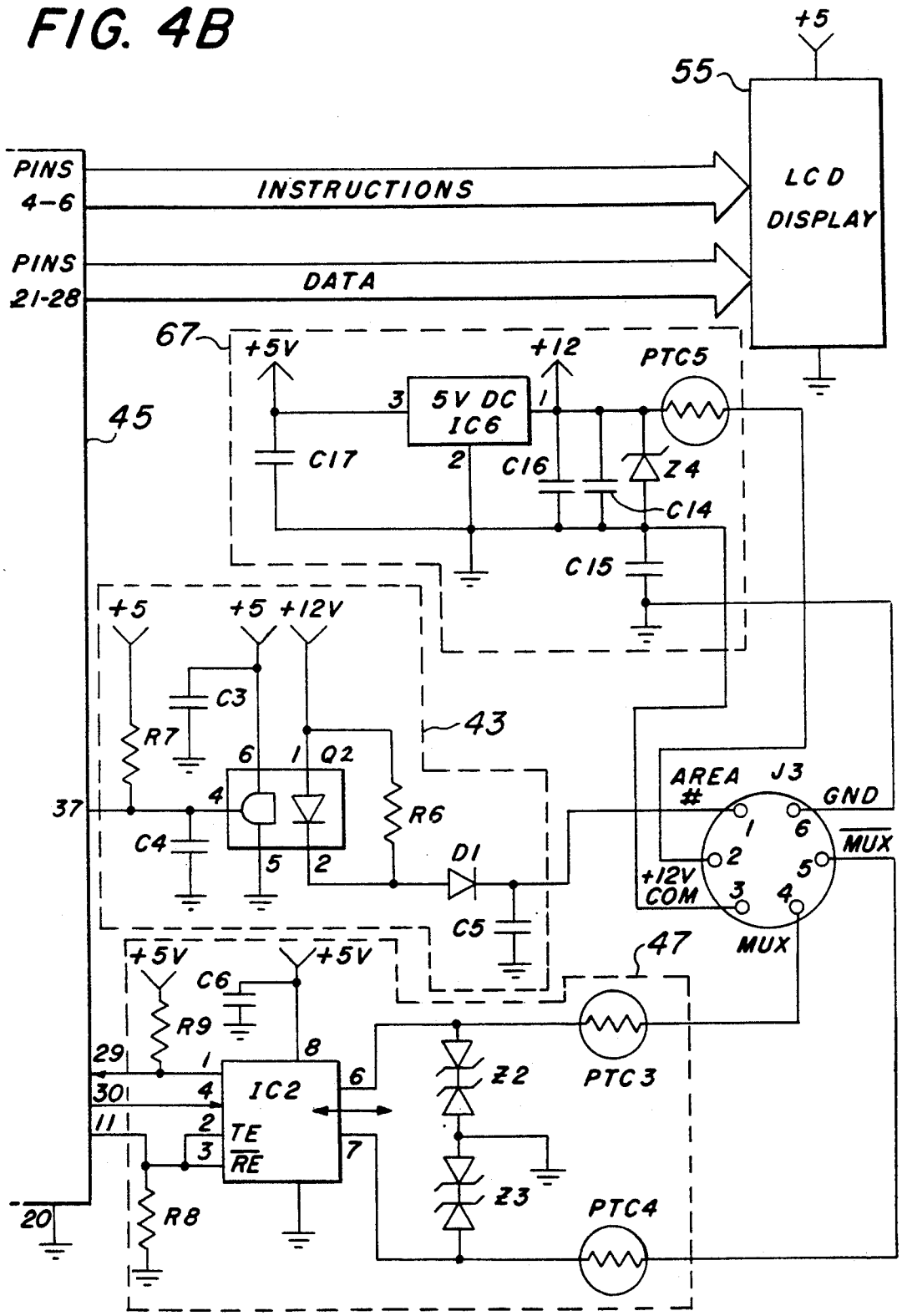

PORTABLE PROGRAMMER FOR A LIGHTING CONTROL

BACKGROUND OF THE INVENTION

1. Field of the Invention

This invention relates to lighting controls and, more particularly, to portable devices for programming programmable lighting controls.

2. Description of the Related Art

An area may be illuminated by several groups or "zones" of lighting, each zone of lighting capable of being dimmed independently of the other zones. A particular combination of lighting levels for the various zones constitutes a lighting "scene." Known lighting control systems permit a user to adjust lighting levels to first create a number of different scenes and then to select a particular scene simply by pushing a button. See, for example, U.S. Pat. 4,575,660, issued Mar. 11, 1986 to Zaharchuk et al., incorporated herein by reference. It is also known to assign to each zone a particular fade time to control the duration of time over which the lights of that zone gradually change (fade) from one preset level to another. Each zone may also be accorded a fade delay to delay the beginning of fading from one preset level to another.

The Orion ® Programmable Lighting Control System, manufactured by Lutron Electronics Co., Coopersburg, PA, includes a programming terminal so that selectable scenes can be adjusted and programmed, by a lighting designer, to suit the requirements of a lighting environment The terminal consists of a keyboard, for selecting and programming scenes, and a computer-driven CRT screen, to display the intensity, fade time, and fade delay setting of each zone in a selected scene. In the interest of brevity, in this specification and the appended claims, intensity, fade time, and fade delay are referred to as "functions." The terminal can program up to 640 scenes in 60 different lighting areas, with up to 1000 total zones of lighting. Lighting intensity in each zone can be varied from 0-99% of full intensity. The fade time and fade delay of each zone is adjustable from 0-99 minutes. A preset scene is selected by pressing a scene-select button on a wall control.

A similarly configured programmable lighting control system, manufactured by Electrosonic Limited, London, England, includes a programming device that is portable. The portable programmer is electrically connectable to the lighting control via a coiled multiwire cable and consists of a plurality of push-buttons, for selecting and programming scenes, and a microcomputer driven single line LCD display, to indicate particular function settings. The display cannot, however, simultaneously indicate multiple function settings for a given scene/zone or simultaneously indicate the name/number of a selected scene and zone. Scenes and zones can be selected on a numeric keypad, and function settings can then be incremented or decremented with up/down buttons Selected zones initially flash on and off for a period of time to indicate their location. Drawbacks of the system are that the keypad and up/down buttons on the programmer are cumbersome to use and require that a number of buttons be pressed to make even a simple function setting adjustment. The buttons that activate each function do not correspond in any readily apparent way to the LCD display, which indicates the function setting. Finally, automatic flashing of selected zones may not be desirable.

A great advantage of portable programmers over stationary ones is that a lighting designer can monitor the lighting in an area as he is programming scenes. This improves the quality of his lighting design and saves him having to go back and forth to a programming terminal.

SUMMARY OF THE INVENTION

The present invention provides a self-teaching, ergonomically designed hand-held programmer for a programmable lighting control system. The system generally controls a number of lighting zones in a number of different areas and provides a plurality of selectable scenes in each area. The programmer generally includes selection push-buttons to select a preset scene and zone and function activator push-buttons to activate a particular function for adjustment. An adjustment actuator, manually movable through a range of positions, is mounted below the push-buttons and is easily manipulated to adjust the activated function. A three-line alphanumeric LCD display has a plurality of individually controllable display areas to indicate the names of the selected scene and zone and the current setting of each function. The LCD display is aligned with the push-buttons so that the names of the selected scene and zone appear immediately adjacent their respective selection buttons, and the function settings appear directly above their respective function activator push-buttons, so that both the button and its corresponding display area can be viewed simultaneously.

When a function is activated, a designator appears next to its corresponding LCD function setting indicator to indicate its activated status. The programmer further provides a "zone-finder" function and corresponding push-button, which can be actuated to flash a selected zone on and off to assist in locating it. The zone flashes for as long as the button is held down and returns to its preset intensity setting when the button is released.

A coiled multiwire cable and plug electrically connect the hand-held programmer to a wall station. The wall station is connected to the programmable lighting control and enables multiplexed communication between the programmer and the lighting control. The wall station includes a locking type socket, which prevents the programmer from being inadvertently disconnected due to tension on the cable.

In one embodiment of the present invention, a portable programmer for adjusting various function settings of a programmable lighting control comprises:

a) a supporting housing;
b) a plurality of push-buttons disposed on a front surface of said support housing for selecting a scene and zone to be programmed and for activating one of said various functions to be adjusted;
c) means for adjusting said activated function; and
d) display means on said front surface of said support housing for simultaneously identifying said selected scene and zone and indicating said function settings, said display means having a plurality of individually controllable display areas aligned with said plurality of push-buttons, so that each display area corresponds to at least one button.

In another embodiment of the present invention, a portable programmer for adjusting various function settings of a programmable lighting control comprises a support housing, on which are mounted:
a) a plurality of push-buttons for selecting a scene and zone to be programmed and for activating one of said functions to be adjusted; and
b) actuator means, manually movable through a range of positions for adjusting said activated function.

In another embodiment of the present invention, a portable programmer for adjusting various function settings of a programmable multi-zone, multi-scene lighting control comprises:
a) a support housing;
b) means attached to said support housing for selecting a scene and zone to be programmed;
c) push-button activated means for flashing said selected zone on and off while said push-button is depressed;
d) means attached to said support housing for activating one of said functions to be adjusted; and
e) means for adjusting said activated function In another embodiment of the present invention, a portable programmer for adjusting various function settings of a multi-zone, multi-scene programmable lighting control comprises:
a) a support housing, on which are mounted
  i) means for selecting a scene and zone to be programmed and for activating any one of said functions to be adjusted;
  ii) means for adjusting said activated function; and
  iii) an electrical socket, and
b) a multiwire cable having a first plug at one end for insertion into said socket and a second plug at the opposite end for insertion into a wall-mounted socket to electrically connect said programmer to said programmable lighting control, said plugs including locking means to prevent them from being inadvertently unplugged.

In another embodiment of the present invention, in a lighting area having an identifying area number, a wall-mounted device for providing communication between a programmable lighting control and a portable programmer comprises:
a) a support housing;
b) means, disposed within said support housing, for storing information representative of said area number;
c) circuit means, disposed within said support housing, for electrically connecting said wall-mounted device to said programmable lighting control to provide communication therebetween;
d) means, connected to said circuit means and said storing means, for transmitting information, including said area number information, to said programmer; and
e) means, connected to said circuit means, for receiving information from said programmer.

In another embodiment of the present invention, a portable programmer for adjusting various function settings of a programmable lighting control comprises:
a) a support housing;
b) means, attached to said support housing, for electrically connecting said portable programmer to a wall station in a selected one of a plurality of lighting areas to provide communication between said programmer and said lighting control;
c) a plurality of push-button means, disposed on a front surface of said support housing, for selecting a scene and zone in said selected area to be programmed and for activating one of said functions to be adjusted;
d) circuit means, disposed within said support housing, for preventing selection of a scene or zone in an area other than said selected area; and
e) means for adjusting said activated function.

BRIEF DESCRIPTION OF THE DRAWINGS

FIG. 4 consisting of FIGS. 4A and 4B, is a circuit schematic of a hand-held programmer of the present invention.

DETAILED DESCRIPTION OF THE INVENTION

Figure 1:
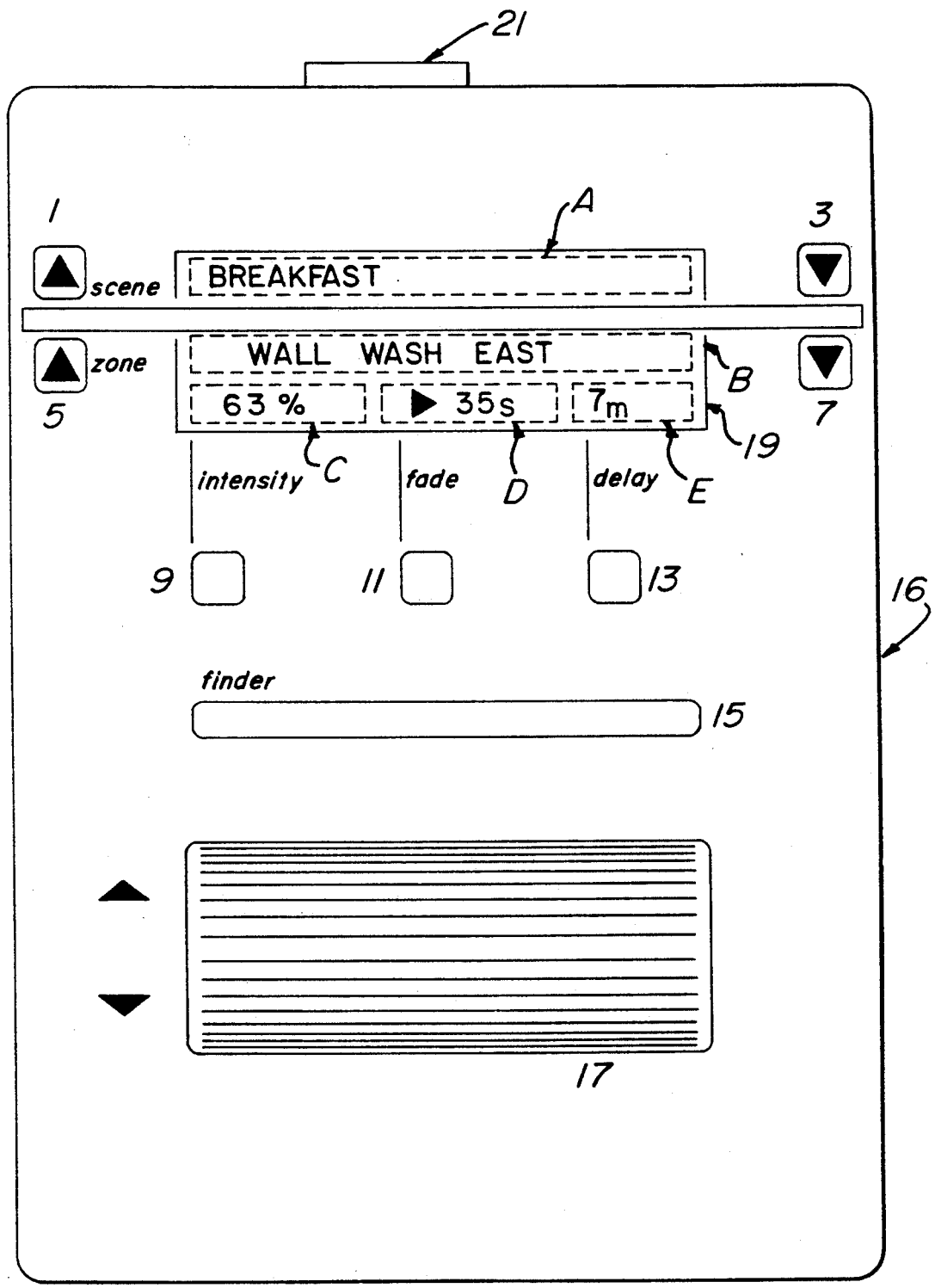
FIG. 1 is a front view of a hand-held programmer of the present invention.

FIG. 1 is a top view of a hand-held programmer of the present invention. Elements 1, 3, 5, 7, 9, 11, 13, and 15 are momentary contact switch push-buttons which are arranged on the front surface of support housing 16. Alternatively, membrane switch push-buttons may be used. Push-buttons 1 and 3 are used to select one of a plurality of preset scenes to be programmed. Each scene generally has associated with it a scene number and a name. Pressing push-button 1 increments the scene selection number and causes the name of the selected scene to be displayed on controllable display area (A) of LCD display 19. Similarly, pressing push-button 3 decrements the scene selection number.

Push-buttons 5 and 7 are used to select a particular zone within a selected scene. Pressing push-button 5 or 7 increments or decrements the selected zone number, respectively, and cause the name of the selected zone to be displayed on display area (B) of LCD display 19. Preferably, display areas (A) and (B) are in alignment with corresponding push-buttons 1 and 3 and 5 and 7, respectively, so that use of the push-buttons is self-teaching.

Push-button 15 activates the zone "finder" function. When push-button 15 is depressed, the selected zone flashes on and off, at a frequency preferably between about 1 and 5Hz, to help a lighting designer distinguish the selected zone from other lighting zones in an area. When the push-button is released, the zone intensity returns to its preset level.

The intensity of a selected zone within a preset scene can be adjusted by first pressing push-button 9, to activate the intensity function, and then moving rotary encoder 17 up or down to increment or decrement, respectively, the intensity of the selected zone. The intensity of each zone can be adjusted from 0 (off) to 99% of full intensity with a minimum adjustment increment of 1%. Similarly, fade time or fade delay for each zone can be adjusted by pressing push-button 11 or 13, respectively, and then moving rotary encoder 17. Both functions are adjustable from 0 to 99 minutes, with a minimum adjustment increment of 1 second over the range from 0 to 99 seconds and 1 minute over the range from 1 to 99 minutes. Once a function is activated, it remains so until another function is activated.

Rotary encoder 17 is cylindrical in shape and has a rubbery knurled outer surface, which is partially exposed through support housing 16. The encoder is rotatably mounted within the housing and can be manipulated by a finger or the like to adjust the various function settings. The rotary encoder provides kinesthetic feedback to the finger, so that displacement of the encoder is easily coordinated with a visual perception of the lighting scene. Although rotatable actuators having endless travel are preferred, rotary encoder 17 may alternatively be replaced with the slide actuator of a linear slide potentiometer or any other type of actuator that is manually movable through a range of positions.

Current function settings are simultaneously displayed on controllable LCD display areas C, D, and E, which are aligned with corresponding push-buttons 9, 11, and 13. An LCD-controlled designator next to each function setting display indicates which function is currently activated for adjustment. Alternatively, an LED indicator or any other type of indicator may be provided on or near each push-button to indicate its activated status.

Socket 21 receives a corresponding plug to electrically connect the programmer, via a coiled multiwire cable, to a wall station (not shown). Preferably, the plug is of a locking type, so that it cannot be inadvertently pulled out by tension on the cable. Any suitable locking plug/socket combination, well known in the art, may be used. Among these are connectors manufactured by Redel and distributed by Lemo USA, Santa Rosa, CA; and those available from Molex, Lisle, IL. The wall station has a corresponding socket and provides low voltage power and multiplexed communication between the programmer and a programmable lighting control. Alternatively, an infrared or radio frequency transmitter and receiver may be used to provide communication between the programmer and the programmable lighting control.

Figure 2:
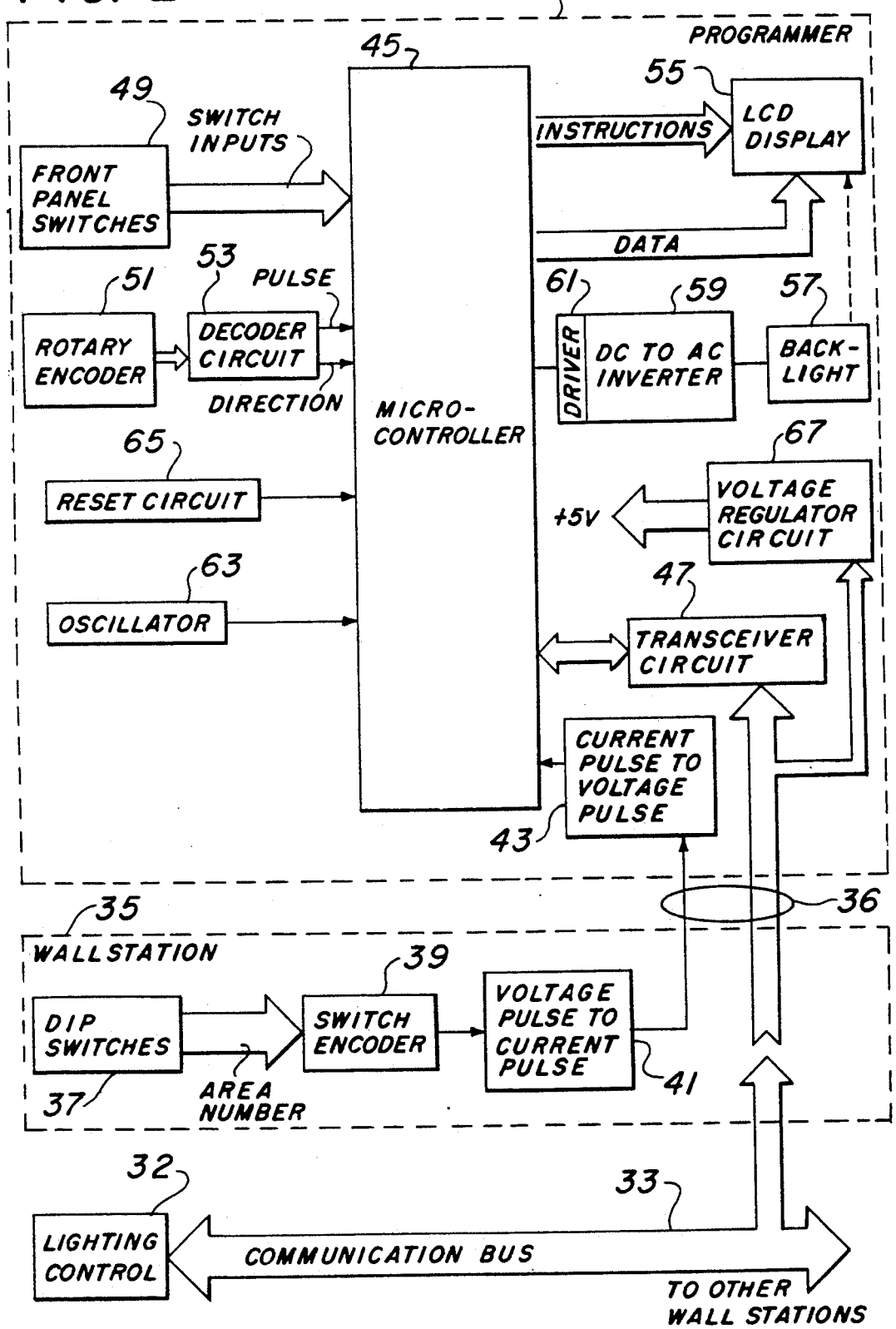
FIG. 2 is a block diagram of a hand-held programmer and wall station of the present invention.

FIG. 2 shows a block diagram of a programmer and wall station of the present invention. Generally speaking, programmer 31 communicates with programmable lighting control 32 via communication bus 33. The bus is electrically connected to wall station 35 and is connectable to programmer 31 by way of multiwire cable 36. If programmable lighting control 32 controls multiple areas, other wall stations (not shown) are connected to bus 33. Generally, programmer 31 is plugged into a wall station in a particular area to program the lighting in that area.

Each wall station has associated with it a unique eight bit area number. This area number can be recognized by programmer 31, so that information associated with each area can be retrieved from lighting control 32. This information may include the number and names of scenes and zones in an area as well as the setting of various associated functions. Once the programmer is plugged into a wall station, only the lighting zones corresponding to its particular area number can be programmed. This prevents inadvertently disrupting lighting in other areas. The area number is preset via a bank of dip switches 37.

When programmer 31 is initially connected to wall station 35, switch encoder 39 serially encodes the eight bit number set by dip switches 37, producing a voltage pulse signal representing the area number. This voltage pulse signal is then converted, by voltage-to-current converter 41, to a current pulse signal which is provided to programmer 31. This current pulse signal is less susceptible to cross-talk due to capacitive coupling with communication bus 33. Within the programmer, current-to-voltage converter 43 restores this current pulse signal to a voltage pulse signal and provides it to element 45.

Element 45 is a multi-function, high-speed, CMOS microcontroller, which forms the central control circuit of programmer 31. Microcontroller 45 reads the area number and relays it, through transceiver 47, to lighting control 32. Transceiver circuit 47 alternately operates as a transmitter and a receiver and conducts all communication between microcontroller 45 and lighting control 32. The lighting control responds with current scene, zone, and function setting information for that area.

Microcontroller 45 receives instructions from front panel switches 49 and rotary encoder 51. The panel switches select scenes and zones and activate functions for adjustment. Rotary encoder 51 adjusts the setting of activated functions. As rotary encoder 51 is moved, decoder circuit 53 provides to microcontroller 45 a serial pulse count, indicating the amount of displacement, and a single high or low bit signal, indicating the direction of displacement. Function setting adjustments are sent via communication bus 33 to lighting control 32, which updates preset scenes and zones accordingly.

LCD display 55 receives data and instructions from microcontroller 45 and displays the names of each selected scene and zone and its corresponding function settings. Backlight 57, preferably an electroluminescent panel, illuminates LCD display 55 and draws high frequency voltage from dc-ac inverter 59. Driver 61 receives instructions from microcontroller 45 to turn the inverter on or off. Alternatively, an LED panel, or any other type of light source, may illuminate LCD 55.

Oscillator 63 provides a 4MHz clock signal to regulate the processing speed of microcontroller 45. Voltage regulator 67 draws current from communication bus 33 at 12V and provides a stable output voltage of +5V to elements 43, 45, 47, 53, and 65. Reset circuit 65 monitors this +5V output and resets the microcontroller if the voltage sags below about 4.7V.

Figure 3:
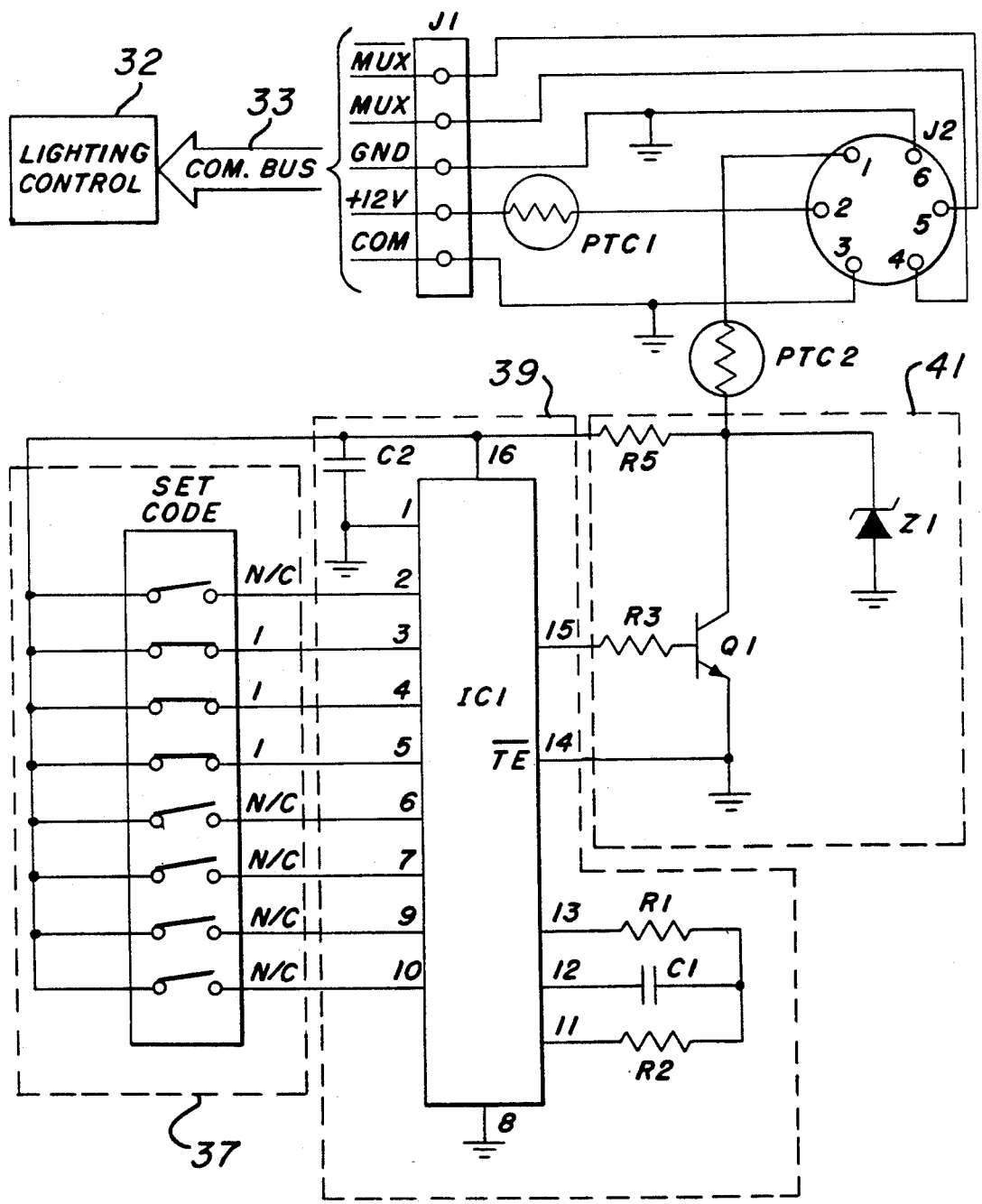
FIG. 3 is a circuit schematic of a wall station of the present invention.

FIG. 3 is a circuit schematic of a wall station of the present invention. Communication bus 33 connects to terminal block J1. MUX and $\overline{\text{MUX}}$ are balanced multiplexed communication lines, which carry data between the wall station and lighting control 32. GND is earth ground and is connected to a metal wallbox that houses the wall station. Power is provided by the +12V line referenced to circuit common (COM). PTC1 is connected in series with the +12V line to protect against excessive currents in case of miswiring.

Socket J2 has six terminals for receiving a corresponding plug. The plug is connected to a multi-wire cable, which electrically connects the wall station to the hand-held programmer (not shown). When the plug is inserted into socket J2, +12V is provided on terminal 1 with respect to circuit common (COM). This voltage is provided to dip switches 37, which provides eight parallel bits corresponding to the wall station area number, in this case 14. IC1 is a CMOS trinary serial encoder, which reads the parallel input on pins 2–9 and transmits a voltage pulse signal on pin 15 representing the area number. Refer to Motorola, *CMOS/NMOS Special Functions Notebook*, 1988, Section 7, pages 27–37, for details and specifications. In this case, transmission is continuous, since the transmit enable ($\overline{\text{TE}}$) pin 14 is tied to ground. The frequency of this serial output is determined by the values of R1, R2, and C1 and is preferably no less than about 1kHz. Frequencies below 1kHz tend to cause susceptibility to external noise.

This pulsating voltage is applied across resistor R3 and the base-emitter junction of transistor Q1, forming a pulsating collector current therethrough representing the wall station area number. This current pulse signal is provided to the programmer through terminal 1 of socket J2. The voltage on terminal 1 is kept relatively constant at +12V to power serial encoder IC1. Resistor R4 sets the collector current through transistor Q1 to a preferred nominal maximum of about 18 mA.

PTC2 prevents excessive currents from damaging the circuit in the event of a miswire. Zener diode Z1 prevents damage to the circuit due to line voltage surges or static electric discharge. Resistor R5 and capacitor C2 filter the voltage provided to encoder IC1 to prevent interference from the 1kHz pulsating current through transistor Q1 and PTC2 and from other noise sources. Wall station 35 may additionally include push-button switches for selecting preset scenes and LED indicators for indicating selected scenes.

FIG. 4 is a circuit schematic of a hand-held programmer of the present invention. Socket J3 connects, via a multi-wire cable, to a corresponding socket on the wall station (element J2 in FIG. 3). The programmer receives, on pin 1 of socket J3, the pulsating current signal representing the wall station area number. This signal flows through diode D1 and the LED portion of opto-coupled transistor Q2, which provides a corresponding voltage on pin 4. Resistor R6 is selected to draw a predetermined portion of the pulsating current around opto-coupled transistor Q2, so that the transistor operates within its specified current rating. Capacitors C3, C4, and C5 filter noise from their respective nodes of the circuit. Resistor R7 is a pull-up resistor to provide on pin 4 of opto-coupled transistor Q2 a logic 1 when the current through pins 1 and 2 is essentially zero and a logic zero when the current is essentially non-zero.

Microcontroller 45 receives, on input pin 37, the area number signal from current-to-voltage converter 43 and transmits this information back through the wall station to the lighting control via the MUX and $\overline{\text{MUX}}$ lines. The lighting control determines whether this is a valid area number and sends back information that tells the programmer how many scenes are assigned to that area, which scene is currently active, and its name. Communication between the programmer and the lighting control is orchestrated by transceiver 47.

IC2 of FIG. 4, an asynchronous bi-directional transceiver that transmits and receives information to and from the lighting control. Refer to Texas Instruments, *Interface Circuits Databook*. 1987, Section 4, pages 351-360, for details and specifications. Transmit enable (TE) pin 2 and receive enable ($\overline{\text{RE}}$) pin 3 are tied together to output pin 11 of microcontroller 45 to control the direction of information flow through the transceiver. Resistor R8 pulls the transmit/receive enable pins low so that the transceiver is normally in receive mode and must be pulled high to transmit. Pin 1 is the receiving output line that provides information from the lighting control to input pin 29 of microcontroller 45. Pin 4, in contrast, is the transmitting input line that takes information from output pin 30 of microcontroller 45 and transmits it to the lighting control. Transceiver IC2 is either in transmit or receive mode and can never be in both modes simultaneously. Resistor R9 is a pull-up resistor that provides a logic 1 on input pin 29 of microcontroller 45 when transceiver IC2 is in transmit mode. Capacitor C6 filters the voltage supply connected to pin 8 of transceiver IC2.

Pins 6 and 7 of transceiver IC2 are connected to the MUX and $\overline{\text{MUX}}$ lines, respectively, which carry multiplexed signals between the programmer and the lighting control. The signal appears as a differential voltage between the two lines and is preferably about 125 Kbaud, half-duplex between about 0 and 5 volts. Bipolar zener diodes Z2 and Z3 limit excessive voltages with respect to ground on the MUX and $\overline{\text{MUX}}$ lines. PTC3 and PTC4 limit the maximum current through zener diodes Z2 and Z3 and provide a series resistance to reduce line reflections.

Front panel switches 49 and rotary encoder 51 provide programming instructions to microcontroller 45, so that scenes and zones can be selected and function settings can be adjusted. When the ↓ scene switch is momentarily closed, for example, the microcontroller internally decrements the scene selection number and pulls pin 11 high while it transmits the new scene number though transceiver IC2 to the lighting control. The lighting control activates the new scene and replies to the microcontroller, providing it with the name of the selected scene and its maximum zone number. Now, if the ↑ zone switch is momentarily closed, microcontroller 45 internally increments the zone selection number (as long as it does not exceed the maximum zone number) and transmits this new zone number to the lighting control. If the zone number does exceed the maximum number, the zone selection number is set to a minimum zone number, so that a continuous "scrolling" effect is achieved. The lighting control responds with the name of the selected zone and its intensity, fade time, and fade delay.

After each communication is received from the lighting control, microcontroller 45 sends data to alphanumeric LCD display 55 and instructs it to display the names of the selected scene and zone and the setting of..each function associated with that scene and zone. Backlight 57 of FIG. 2 illuminates LCD display 55 and receives power from dc-ac inverter 59, which is controlled by driver 61. If none of the front panel switches have been actuated for an extended period of time (preferably about 30 minutes), microcontroller 45 (or FIG. 4) pulls pin 7 low, removing base-drive from transistor Q3 and turning off dc-ac inverter 59 and backlight 57. This conserves energy and maximizes the useful life of the backlight, which in the case of an electroluminescent panel, as preferred, is limited to about 10,000 hours. Power to the backlight is restored when any of the front panel switches is momentarily closed or rotary encoder 51 is moved. Resistor R10 sets the base-drive to transistor Q3.

Function settings of a selected zone and scene are adjusted via rotary encoder 51. Rotating the encoder generates two square waves A, and B, in quadrature. When the encoder is rotated upward, square wave A leads B by 90. Decoder circuit 53 determines both magnitude and direction of rotation by comparing the two square waves.

The decoder circuit consists essentially of a quad-Schmidt-triggered nand gate IC3 and flip-flop IC4. Square wave A is inverted by nand gate N1 and combined with square wave B to provide $\overline{\text{A}}\text{B}$ on the output of nand gate N2. Similarly, nand gates N3 and N4 operate to provide $\overline{\text{AB}}$ on the output of nand gate N4. Capacitor C7, resistor R11, and inverter I1 invert and delay the output of nand gate N3 to produce square wave B', which lags square wave B and is fed to the data line (pin 12) of flip-flop IC4. When the output of nand gate N4 pulls the set ($\overline{S}$) pin 1 low, inverted output ($\overline{Q}$) pin 6 is driven low, pulling interrupt ($\overline{IRQ}$) pin 2 of microcontroller 45 low, which tells microprocessor 45 it that the encoder has been incrementally displaced. Simultaneously, output (Q) pin 5 is driven high, incrementing the clock (pin 11) and latching the data bit on pin 12. The characteristics of the circuit are such that when rotary encoder 51 is rotated upward, a high bit is latched on pin 12 during each clock cycle. Downward rotation causes a low bit to be latched. This data bit is provided to input pin 36 of microcontroller 45 to indicate the direction of displacement. Resistors R12 and R13 pull up the input lines of nand gates N1 and N3, respectively, to +5V. Capacitors C8, C9, and C10 filter noise from their respective nodes of decoder circuit 53.

Momentarily closing the INTENSITY switch activates rotary encoder 51 to adjust the intensity of the selected zone in the selected scene The zone intensity can be increased or decreased, respectively, by rotating the encoder upward or downward. The displacement of the wheel is determined by counting the number of successive low bits on interrupt ($\overline{IRQ}$) pin of microcontroller 45 and reading the direction signal on input pin 36. The new intensity setting is sent to the lighting control via transceiver 47.

Oscillator 63 comprises a 4MHz resonant crystal X1, resistor R14, and capacitors C11 and C12 connected to pins 38 and 39 of microcontroller 45 in a standard configuration.

Reset circuit 65 comprises under-voltage sensor IC5, resistor R15, and capacitor C13. Sensor IC5 monitors the supply voltage +5V from voltage regulator 67 and pulls reset pin 1 of microcontroller 45 low if this voltage drops below a predetermined minimum, preferably about 4.7 volts. Refer to Motorola *Linear and Interface Integrated Circuits*, 1988, Section 3 pages 242-245, for details and specifications of sensor IC5. After pin 1 is pulled low, resistor R15 charges capacitor C13, over a time delay of about 220 ms, to +5V, pulling reset pin 1 high and restarting microcontroller 45. This time delay is provided to prevent jitter on the reset pin.

Voltage regulator 67 converts +12V from connector J3 into a regulated +5V supply to power various components of the programmer, including microcontroller 45. IC6 is a series low-dropout voltage regulator that regulates the output voltage to +5V plus or minus 0.2V. Refer to National Semiconductor *Linear Supplement Databook*, 1984, Section 3, pages 7-12, for specifications and details. Zener diode Z4 protects IC6 from transient voltage spikes, which may damage it. PTC5 prevents excessive amounts of current from flowing through zener diode Z4. Capacitors C14 and C15 are preferably of ceramic construction for filtering high-frequency noise ($\geq$100KHz) from the +12V and circuit common (COM) lines, respectively. Capacitor C16, preferably an electrolytic type, filters lower frequency noise from the +12V line. Capacitor C17, preferably a tantalum type, filters both high-frequency and lower-frequency noise from the regulated +5V supply line (pin 3 of IC6).

Although not shown, input pins 8-10, 12-19, and output pins 4-6 and 21-28 of microcontroller 45 are connected to +5V through pull-up resistors. Capacitor C18 filters the power supply line of microcontroller 45.

Figure 5A:
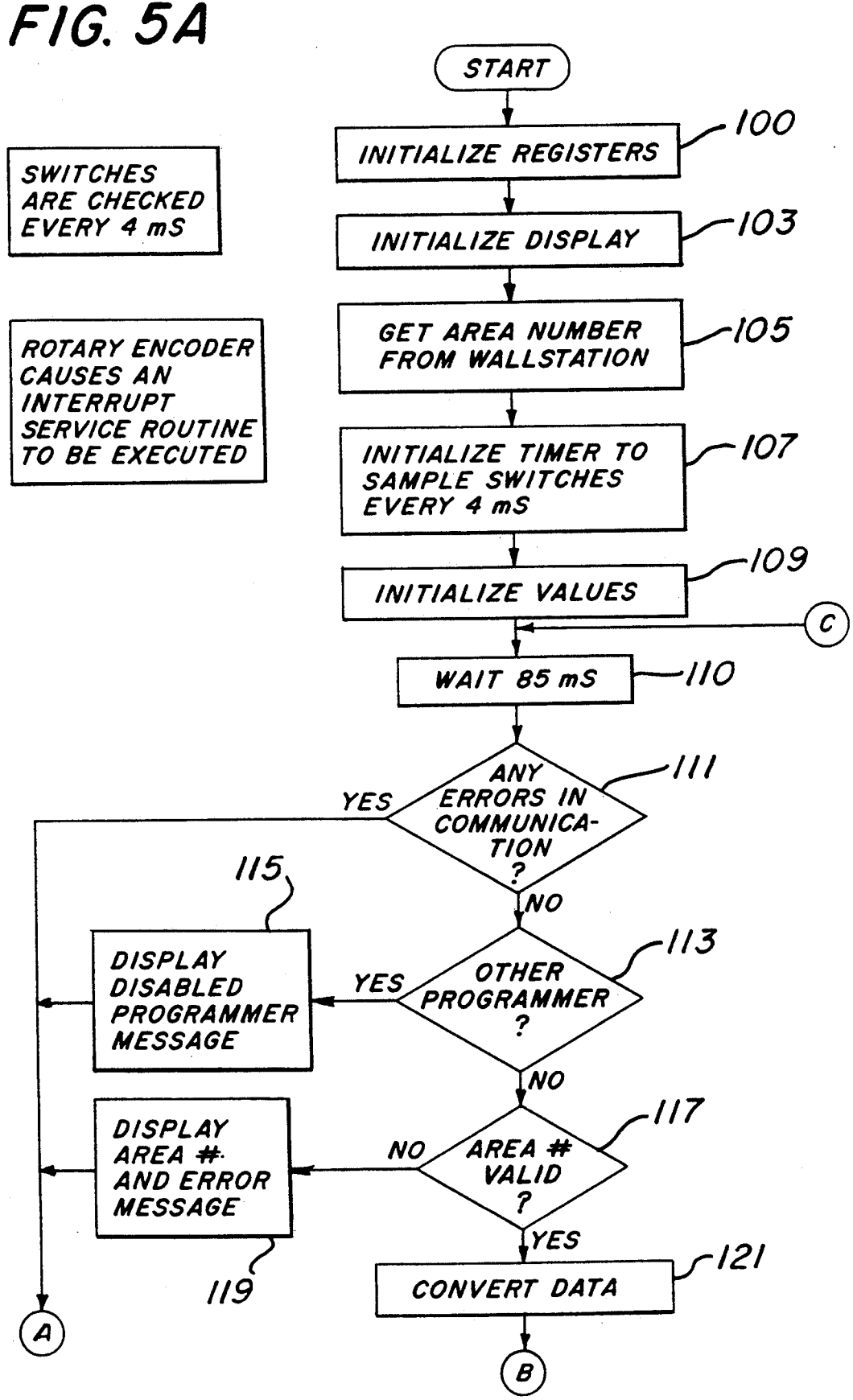
FIG. 5, consisting of FIGS. 5A and 5B, and 5C is a short of the software contained in the microcontroller of FIG. 4.
Figure 5B:
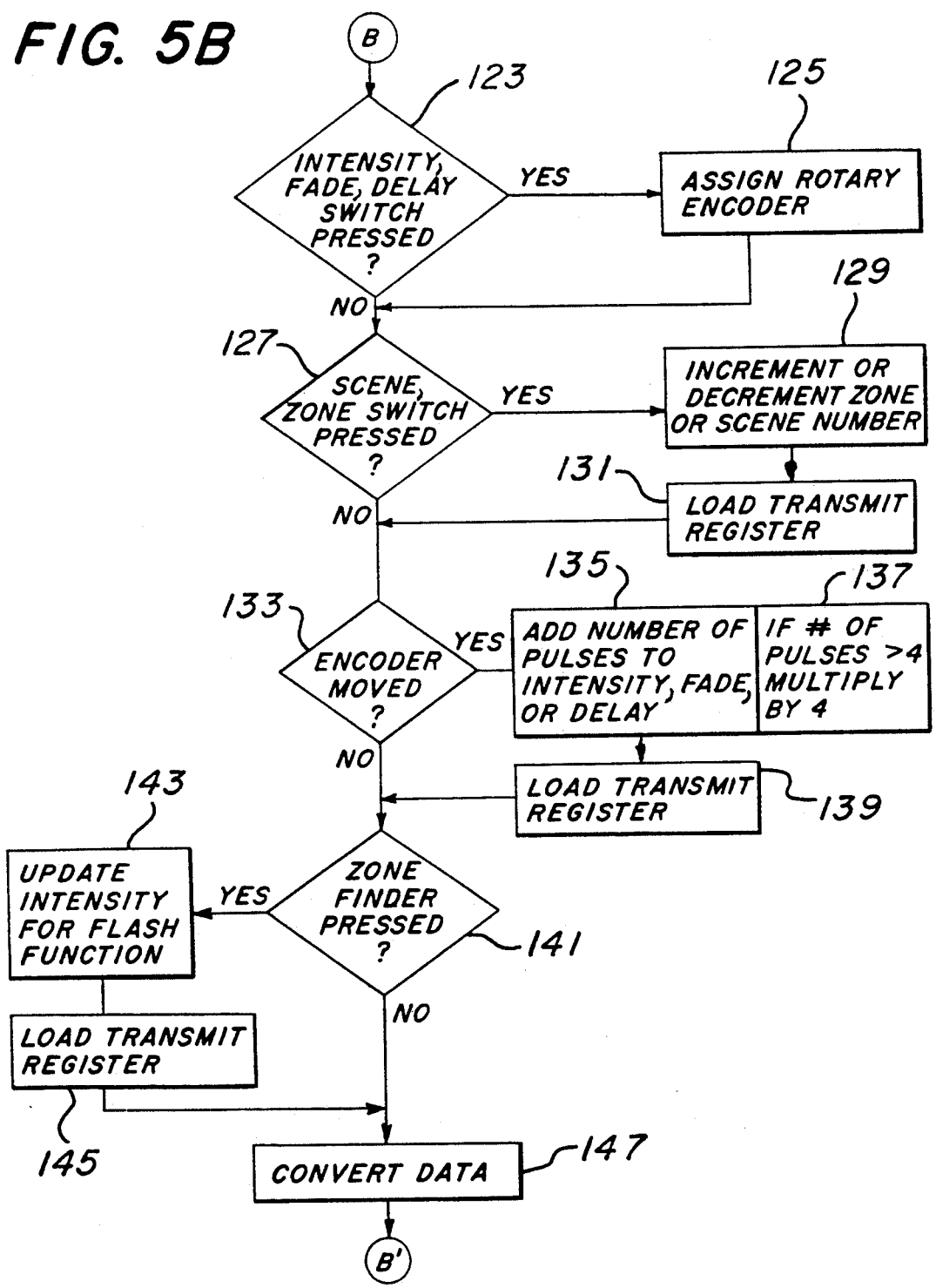
Figure 5C:
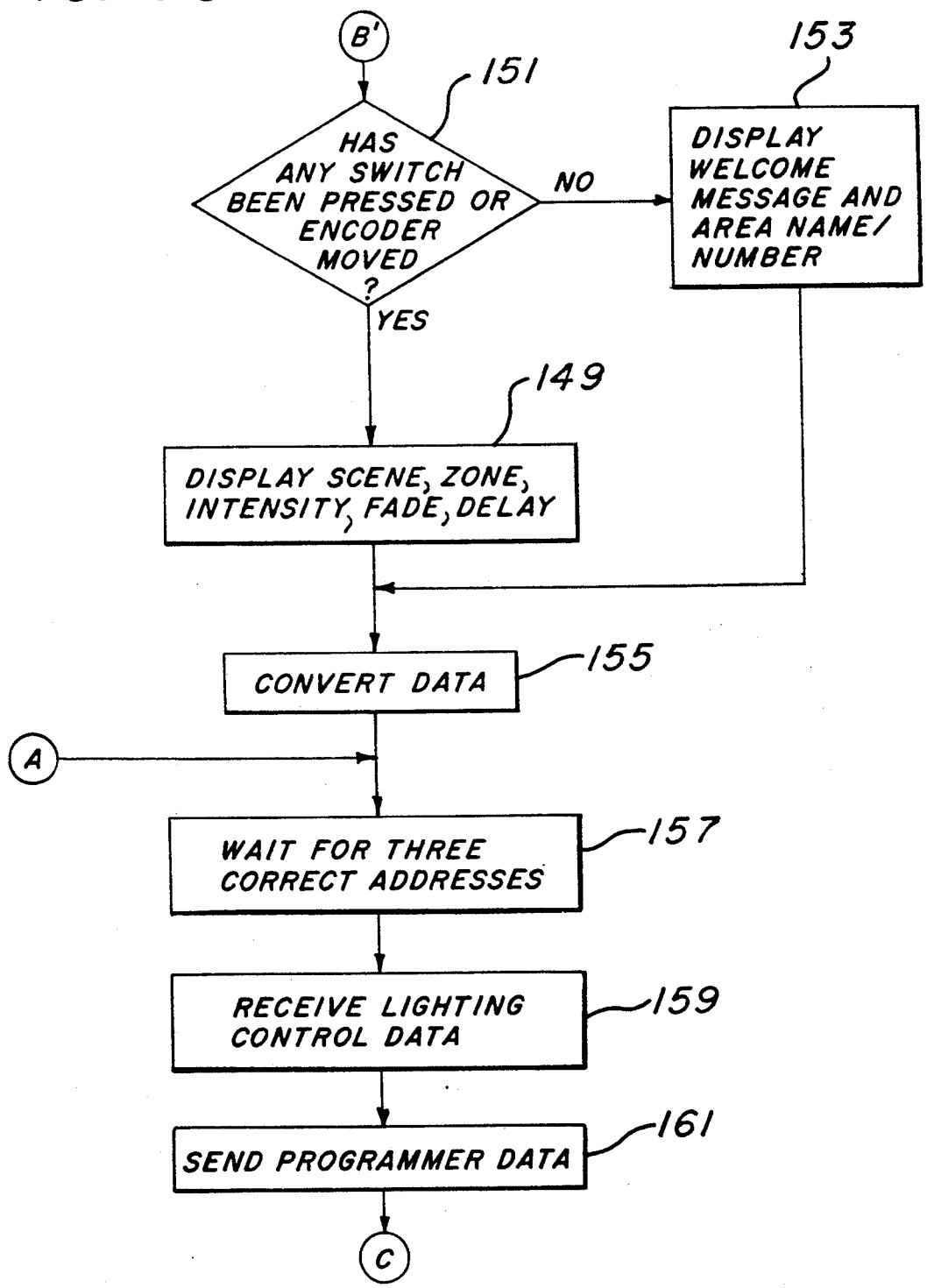

FIG. 5, consisting of FIGS. 5A and 5B, is a of the software contained in the microcontroller of FIG. 4. Beginning with step 100 of FIG. 5A, when the programmer is first connected to a wall station, the internal registers are initialized, memory space is cleared, and the baud rate for communication is set. Step 103 clears the LCD display and sets the data length (i.e., the format in which information is exchanged) to eight bits. This data length corresponds to one ASCII alphanumeric character.

Once all the internal registers and LCD display parameters are initialized, the area number is received (105) from the wall station. The timer interrupt is instructed (107) to sample the front panel switches every 4 ms and program variables are initialized (109).

The microcontroller delays for about 85 ms at step 110 and waits for a switch to close or for the rotary encoder to be displaced. The rotary encoder, upon displacement, executes an interrupt service routine that increments or decrements a register as each pulse is received from the decoder circuit (element 53 in FIG. 4).

If there are any errors (111) in communication that have occurred, the main routine is exited and the microcontroller jumps to point A. If the programmable lighting control is being simultaneously programmed (113) from another area or from a terminal hard-wired to the lighting control, an "error" message is displayed (115) on the LCD display indicating this problem and the microcontroller jumps to point A. Likewise, if the area number received from the wall station is not valid (117) (e.g., if it is larger than the maximum area number), the area number and an error message are displayed (119) and the microcontroller jumps to point A.

The programmer data and the lighting control data may have non-compatible formats due to differences in hardware and software structure. In that case, scene and zone numbers and names, and corresponding function settings received from the lighting control are converted (121) into a format recognized by the programmer. This step is not necessary if the data have compatible formats.

If any of the functions (intensity, fade time, or fade delay) have been activated (123), the rotary encoder is assigned (125) to adjust the activated function. If the scene or zone up/down buttons have been pressed (127), the scene or zone selection number is incremented or decremented accordingly (129), and the new scene or zone number is loaded (131) into a transmit register to be transmitted to the lighting control.

If the rotary encoder has been displaced (see 133 FIG. 5B), the activated function is increased or decreased (135) according to an adjustment increment and the pulse count on interrupt $\overline{IRQ}$ pin 2 of microcontroller 45 in FIG. 4. If the pulse count is larger than four, then this adjustment increment is multiplied by a factor of four (137). This enlarged increment "kicks in" at a rotary encoder velocity between about 0.5 and 3 r/s so that a function can be quickly adjusted from one extreme to another without requiring undue displacement of the rotary encoder. The new function setting is loaded (139) into the transmit register to be transmitted to the lighting control.

If the zone finder button (element 15 in FIG. 1) is depressed (141), the intensity of that zone is "updated" (143); i.e., adjusted to full on or full off, according to a flash cycle, and the new intensity value is loaded (145) into the transmit register to be transmitted to the lighting control. In order to maximize the immediate visibility of the selected zone, the flash cycle initially begins at full-on or full-off when the preset zone intensity is less than or greater than 50% of full intensity, respectively.

At step 147, the current scene and zone names and function settings are converted into ASCII code, having a data length of eight bits, and the corresponding alphanumeric symbols are displayed (149) on the LCD display (element 19 in FIG. 1). If no switches have been pressed and the rotary encoder has not been rotated (151) since the programmer was initially connected to a wall station, then step 149 is by-passed and a "welcome" message is displayed (153), indicating the area name and number of the wall station. Once a button is pressed or the rotary encoder rotated, the welcome message is replaced with a display of the current scene and zone names and the settings of the intensity, fade time, and fade delay functions.

The data in the transmit register is converted into a format recognized by the lighting control (155) and the programmer waits to be addressed by the lighting control (157). The lighting control repeatedly addresses the programmer approximately every ⅛ second. When the programmer recognizes three successive addresses, it receives (159) any data that the lighting control is transmitting and transmits (161) the converted data in the transmit register. Essentially, the lighting control communicates to the microcontroller the actual intensity, fade time, and fade delay for the selected scene and zone. The microcontroller communicates to the lighting control any updated function settings. Preferably, at the end of each communication, a "checksum", which is the sum of all communicated bytes, is appended to the information transmitted to the lighting control. This number is compared to the sum of received bytes to verify that the data received was the data sent. Alternatively, other verification schemes, such as "handshaking", may be used, but the checksum is preferred, since it is fast and simple.

Since certain changes may be made to the above described device without departing from the scope of the invention herein involved, it is intended that all matter contained in the above description or shown in the accompanying drawings shall be interpreted in an illustrative and not a limiting sense.

We claim:

1. A portable programmer for adjusting various function settings of a programmable lighting control, comprising:
   a) a support housing;
   b) a plurality of push-buttons disposed on a front surface of said support housing for selecting a scene and zone to be programmed and for activating one of said functions to be adjusted;
   c) means for adjusting said activated function; and
   d) display means on said front surface of said support housing for simultaneously identifying said selected scene and zone and indicating said function settings, said display means having a plurality of individually controllable display areas aligned with said plurality of push-buttons, so that each display area corresponds to at least one button; and
   wherein at least three of said plurality of push-buttons are substantially aligned in a horizontal array below said display means.

2. A portable programmer for adjusting various function settings of a programmable lighting control, comprising:
   a) a support housing;
   b) a plurality of push-buttons disposed on a front surface of said support housing for selecting a scene and zone to be programmed and for activating one of said functions to be adjusted;
   c) means for adjusting said activated function, said adjusting means including an actuator comprising a rotary encoder, mounted on said support housing, that is manually movable through a range of positions for adjusting said activated function;
   d) display means on said front surface of said support housing for simultaneously identifying said selected means and zone and indicating said function settings, said display means having a plurality of individually controllable display areas aligned with said plurality of push-buttons, so that each display area corresponds to at least one button; and
   wherein said rotary encoder is cylindrically elongated along a horizontal axis and is mounted in said support housing below and substantially aligned with said display means.

3. A portable programmer for adjusting various function settings of a programmable lighting control, comprising:
   (a) a support housing;
   (b) a plurality of push-buttons disposed on a front surface of said support housing for selecting a scene and a zone to be programmed and for activating one of said functions to be adjusted;
   (c) means for adjusting said activated function said adjusting means including an actuator comprising a rotary encoder, mounted on said support housing, that is manually movable through a range of positions for adjusting said activated function;
   (d) display means on said front surface of said support housing for simultaneously identifying said selected scene and zone and indicating said function settings, said display means having a plurality of individually controllable display area aligned with said plurality of push-buttons, so that each display area corresponds to at least one button; and
   wherein said rotary encoder increases or decreases said function setting by an amount that is proportional to its displacement and to a predetermined adjustment increment, and wherein said adjustment increment increases by a factor of four when a rotational velocity of said rotary encoder exceeds a predetermined velocity.

4. The portable programmer of claim 3 wherein said predetermined velocity is approximately between 0.5 r/s and 3 r/s.

5. A portable programmer for adjusting various function settings of a programmable lighting control, comprising:
   a) a support housing;
   b) a plurality of push-button disposed on a front surface of said support housing for selecting a scene and zone to be programmed and for activating one of said functions to be adjusted;
   c) means for adjusting said activated function; and
   d) display means on said front surface of said support housing for simultaneously identifying said selected scene and zone by name and indicating said function settings, said display means having a plurality of individually controllable display area aligned with said plurality of push-buttons, so that each display area corresponds to at least one button.

6. A portable programmer for adjusting various function settings of a programmable lighting control, comprising a support housing, on which are mounted;
   a) a plurality of push-buttons for selecting a scene and zone to be programmed and for activating one of said functions to be adjusted; and
   b) actuator means, manually movable through a range of positions for adjusting said activated function; and wherein at least three of said plurality of push-buttons are substantially aligned in a horizontal array.

7. A portable programmer for adjusting various function settings of a programmable lighting control, comprising a support housing, on which are mounted:
   a) a plurality of push-buttons for selecting a scene and zone to be programmed and for activating one of said functions to be adjusted; and
   b) actuator means, manually movable through a range of positions for adjusting said activated function, said movable actuator comprising a rotary encoder, said rotary encoder having a knurled surface, which is partially exposed through said support housing; and wherein said rotary encoder is cylindrically elongated along a horizontal axis and is mounted in said housing support below and substantially aligned with said display means.

8. A portable programmer for adjusting various function settings of a programmable lighting control, comprising a support housing, on which are mounted;
   (a) a plurality of push-buttons for selecting a scene and zone to be programmed and for activating one of said functions to be adjusted; and
   (b) actuator means, manually movable through a range of positions for adjusting said activated function, said movable actuator comprising a rotary encoder, wherein said rotary encoder increases or decreases said function setting by an amount that is proportional to its displacement and to a predetermined adjustment increment, and wherein said adjustment increment increases by a factor of four when a rotational velocity of said rotary encoder exceeds a predetermined velocity.

9. The portable programmer of claim 8 wherein said predetermined velocity is approximately between 0.5 r/s and 3 r/s.

10. A portable programmer for adjusting various function settings of a programmable multi-zone, multi-scene lighting control, comprising
   a) a support housing;
   b) means attached to said support housing for selecting a scene and zone to be programmed, said selecting means comprising a vertically aligned array of pushbuttons;
   c) push-button operated means for flashing said selected zone on and off while said push-button is depressed;
   d) means attached to said support housing for activating one of said functions to be adjusted; and
   e) means for adjusting said activated function.

11. The portable programmer of claim 10 wherein said array of push-buttons comprise momentary contact switch push-buttons.

12. The portable programmer of claim 10 wherein said array of push-buttons comprise membrane switch push-buttons.

13. A portable programmer for adjusting various function settings of a programmable multi-zone, multi-scene lighting control, comprising
   a) a support housing;
   b) means attached to said support housing for selecting a scene and zone to be programmed;
   c) push-button operated means for flashing said selected zone on and off while said push-button is depressed, said flashing means being operated by a horizontally elongated momentary pushbutton on said support housing;
   d) means attached to said support housing for activating one of said functions to be adjusted;
   e) means for adjusting said activated function.

14. The portable programmer of claim 13 wherein said flashing means flashes said selected zone at a frequency approximately between 1Hz and 5Hz.

15. A portable programmer for adjusting various function settings of a programmable multi-zone, multi-scene lighting control, comprising
   a) a support housing;
   b) means attached to said support housing for selecting a scene and zone to be programmed;
   c) push-button operated means for flashing said selected zone on and off while said push-button is depressed, said flashing means comprising means for determining the intensity setting of said selected zone and for initially flashing said zone to full-on or full-off when said zone intensity setting is less than or greater than about 50% of full intensity, respectively;
   d) means attached to said support housing for activating one of said functions to be adjusted; and
   e) means for adjusting said activated function.

16. A portable programmer for adjusting various function settings of a programmable multi-zone, multi-scene lighting control, comprising
   a) a support housing;
   b) means attached to said support housing for selecting a scene and zone to be programmed;
   c) push-button operated means for flashing said selected zone on and off while said push-button is depressed;
   d) means attached to said support housing for activating one of said functions to be adjusted, said activating means comprising a horizontal array of push-buttons and each push-button in said array activating one of said functions; and
   e) means for adjusting said activated function.

17. A portable programmer for adjusting various function settings of a programmable multi-zone, multi-scene lighting control, comprising
   a) a support housing;
   b) means attached to said support housing for selecting a scene and zone to be programmed;
   c) push-button operated means for flashing said selected zone on and off while said push-button is depressed;
   d) means attached to said support housing for activating one of said functions to be adjusted.
   e) means for adjusting said activated function, said adjusting means including an actuator comprising a rotary encoder, mounted on said support housing, that is manually movable through a range of positions for adjusting said activated function, said rotary encoder having a knurled surface which is partially exposed through said support housing, said rotary encoder being cylindrically elongated along a horizontal axis.

18. In a lighting area having an identifying area number, a wall-mounted device for providing communication between a programmable lighting control and a portable programmer, comprising;
   a) a support housing;
   b) means, disposed within said support housing, for storing information representative of said area number;
   c) circuit means, disposed within said support housing, for electrically connecting said wall-mounted device to said programmable lighting control to provide communication therebetween;
   d) means, connected to said circuit means and said storing means, for transmitting information, including said area number information, to said programmer; and
   e) means, connected to said circuit means, for receiving information from said programmer.

19. The portable programmer of claim 18 wherein said storing means comprises a bank of individually settable dip switches.

20. The portable programmer of claim 19 wherein said storing means further comprises a serial encoder for providing serial information representative of said dip switch positions.

21. The portable programmer of claim 18 wherein said circuit means comprises a multi-terminal connector.

22. The portable programmer of claim 21 wherein said circuit means further comprises voltage surge and short circuit protection means.

23. The portable programmer of claim 18 wherein said transmitting means and said receiving means comprise a multi-terminal socket, attached to said support housing, for receiving a corresponding plug to electrically connect said wall-mounted device to said programmer.

24. The portable programmer of claim 17 wherein said multi-terminal socket is of a type that receives a locking type plug.

25. The portable programmer of claim 17 wherein said multi-terminal socket further provides power to said programmer.

26. The portable programmer of claim 18 wherein said transmitting means comprises a radio frequency transmitter.

27. The portable programmer of claim 18 wherein said transmitting means comprises an infrared transmitter.

28. The portable programmer of claim 18 wherein said receiving means comprises a radio frequency receiver.

29. The portable programmer of claim 18 wherein said receiving means comprises an infrared receiver.

30. The portable programmer of claim 18 further comprising at least one push-button means disposed on a front surface of said support housing for selecting one of a plurality of preset lighting scenes.

31. The portable programmer of claim 30 further comprising means for indicating said selected zone.

32. A portable programmer for adjusting various function settings of a programmable lighting control, comprising:
   a) a support housing;
   b) means, attached to said support housing, for electrically connecting said portable programmer to a wall station in a selected one of a plurality of lighting areas to provide communication between said programmer and said lighting control;
   c) a plurality of push-buttons, disposed on a front surface of said support housing, for selecting a scene and zone in said selected area to be programmed and for activating one of said functions to be adjusted;
   d) circuit means, disposed within said support housing for preventing selection of a scene or zone in an area other than said selected area; and
   e) means for adjusting said activated function.

33. The portable programmer of claim 32 wherein said connecting means comprises a multi-terminal socket.

34. The portable programmer of claim 33 wherein said socket is of a type that receives a locking type plug.

35. The portable programmer of claim 33 wherein said connecting means further comprises a coiled, multi-wire cable.

36. The portable programmer of claim 32 wherein said plurality of push-buttons comprise momentary contact switch push-buttons.

37. The portable programmer of claim 32 wherein said plurality of push-buttons comprise membrane switch push-buttons.

38. The portable programmer of claim 32 wherein said circuit means comprises a microcontroller.

39. The portable programmer of claim 32 wherein said adjusting means includes an actuator that is mounted on said support housing and manually movable through a range of positions for adjusting said activated function.

40. The portable programmer of claim 39 wherein said actuator comprises a rotary encoder.

41. The portable programmer of claim 40 wherein said rotary encoder has a knurled surface, which is partially exposed through said support housing.

42. The portable programmer of claim 40 wherein said rotary encoder is cylindrically elongated along a horizontal axis.

43. The portable programmer of claim 32 further comprising display means on said front surface of said support housing, for simultaneously identifying said selected scene and zone and indicating the values of said function settings.

44. The portable programmer of claim 43 wherein said display means comprises a plurality of individually controllable display areas that are aligned with said plurality of push-buttons so that each display area corresponds to at least one push-button.

45. The portable programmer of claim 43 wherein said display means identifies said selected scene and zone by name.

46. The portable programmer of claim 43 wherein said display means comprises an alphanumeric LCD display.

* * * * *